(12) United States Patent
Swamy (10) Patent No.: US 9,099,934 B2
(45) Date of Patent: Aug. 4, 2015

(54) THREE PHASE ACTIVE RECTIFIER SYSTEM

(75) Inventor: Mahesh M. Swamy, Gurnee, IL (US)

(73) Assignee: Yaskawa America, Inc., Waukegan, IL (US)

( * ) Notice: Subject to any disclaimer, the term of this patent is extended or adjusted under 35 U.S.C. 154(b) by 421 days.

(21) Appl. No.: 13/347,097

(22) Filed: Jan. 10, 2012

(65) Prior Publication Data
US 2013/0176753 A1    Jul. 11, 2013

(51) Int. Cl.
*H02M 5/45*    (2006.01)
*H02M 1/42*    (2007.01)

(52) U.S. Cl.
CPC .......... *H02M 1/4216* (2013.01); *Y02B 70/126* (2013.01)

(58) Field of Classification Search
CPC .......................... H02M 1/4216; H02M 5/458
USPC ......... 363/34, 35, 36, 37, 40, 44, 65, 71, 120, 363/121, 131, 132
See application file for complete search history.

(56) References Cited

U.S. PATENT DOCUMENTS

| | | | | |
|---|---|---|---|---|
| 4,238,723 | A * | 12/1980 | Jenks ............................ | 323/322 |
| 5,245,522 | A * | 9/1993 | Kawaguchi et al. ............ | 363/37 |
| 5,585,708 | A * | 12/1996 | Richardson et al. .......... | 318/800 |
| 5,654,591 | A * | 8/1997 | Mabboux et al. ............... | 307/66 |
| 6,046,920 | A * | 4/2000 | Cazabat et al. ............... | 363/136 |
| 8,374,005 | B2 * | 2/2013 | Sakakibara ..................... | 363/34 |
| 8,400,792 | B2 * | 3/2013 | Sato et al. ...................... | 363/39 |

OTHER PUBLICATIONS

Ali I. Maswood and Fangrui Liu, "A Novel Unity Power Factor Input Stage for AC Drive Application", IEEE Transactions on Power Electronics, vol. 20, No. 4, Jul. 2005.
Ewaldo L. M. Mehl and Ivo Barbi, "An Improved High-Power Factor and Low-Cost Three-Phase Rectifier", IEEE Transactions on Industry Applications, vol. 33, No. 2, Mar./Apr. 1997.

* cited by examiner

*Primary Examiner* — Gary L Laxton
*Assistant Examiner* — Afework Demisse
(74) *Attorney, Agent, or Firm* — Wood, Phillips, Katz, Clark & Mortimer (57) ABSTRACT

A voltage source inverter comprises a rectifier converting AC power to DC power at an output. An inverter receives DC power and converts the DC power to AC power. A link circuit is connected between the rectifier circuit and the inverter circuit and comprises a DC bus. A DC bus capacitor across the DC bus smoothes voltage ripple. An active filter circuit comprises a pair of filter capacitors in series across the first and second rails to create a midpoint. Bidirectional switches are connected between the rectifier input and the midpoint. A current sensor is connected between the bidirectional switches and the midpoint. An active switch controller controls a conduction angle of the bidirectional switches to maintain DC bus voltage at a desired reference level under a wide load range.

20 Claims, 7 Drawing Sheets

THREE PHASE ACTIVE RECTIFIER SYSTEM

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to voltage source inverter based variable frequency drives and, more particularly, to an active filter circuit therefor.

BACKGROUND

All voltage source inverter based variable frequency drives (VFDs) have an AC to DC rectifier unit with a large DC capacitor to smooth the voltage ripple. The DC bus capacitor draws charging current only when it is discharged in to the motor load. The charging current flows into the capacitor when the input rectifier is forward biased, which occurs when the instantaneous input voltage is higher than the DC voltage across the DC bus capacitor. The pulsed current drawn from the AC source is rich in harmonics because it is discontinuous. When the pulsed current flows from the AC source, it creates voltage drop in the power delivery equipment. The voltage drop mimics the pulsed current waveform to some extent. The nonlinear voltage drop causes voltage distortion, which is more problematic than current distortion. The reason is that voltage is shared by all loads and it affects all loads connected in an electrical system. Current distortion has a local effect as it pertains to only that branch circuit which is connected to the non-linear load. The voltage distortion is higher if the source impedance is higher. An ac source having a high-impedance is referred to as a "weak AC system". Hence, connecting non-linear loads like VFDs to a weak AC system requires more careful consideration than otherwise.

There are many techniques, both passive and active, that are employed to improve the current waveform and reduce the overall current harmonics. The active techniques have an advantage over the passive techniques in size, and performance. The cost of certain type of active techniques can be higher than passive technique.

Figure 1A:
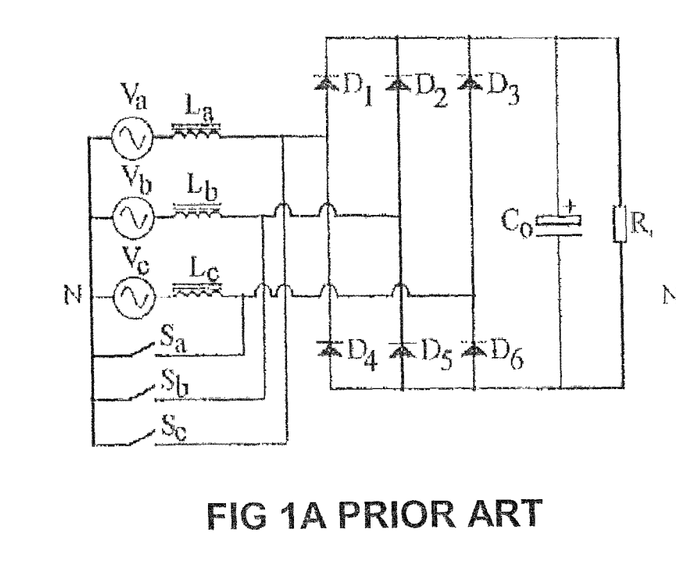
FIGS. 1A, 1B and 2 are schematic drawings for prior art partial boost converters.
Figure 1B:
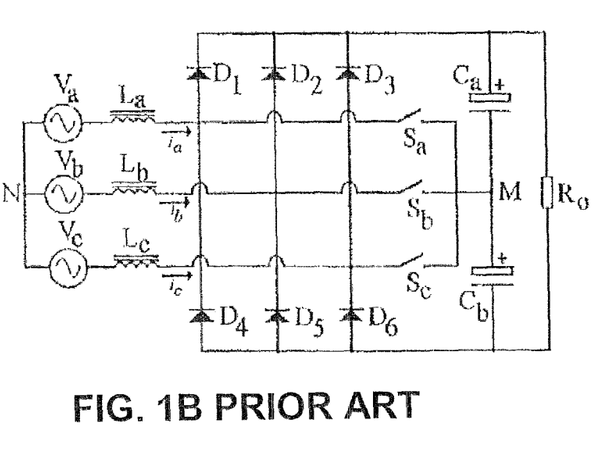

Evaldo L. M. Mehl, and Ivo Barbi in "An Improved High-Power Factor and Low-Cost Three Phase Rectifier", IEEE Trans. on Industry Applications, Vo. 33, No. 2, March/April 1997, pp: 485-492, discuss a low cost active circuit. Two versions of the basic circuit are shown in FIGS. 1A and 1B. The topology shown in these circuits employs bidirectional switches that are rated only to handle the harmonic compensation current. This current is typically only about 30% of the current rating of the AC to DC rectifier. The topology also lends itself easy for integration with the drive. The circuit does not support regeneration. Since most HVAC applications do not need regeneration, there is no strong desire to propose the fully regenerative active front end converter system, which is bulkier, more expensive, and occupies large space.

The topology shown in FIGS. 1A and 1B is a three-phase partial boost converter that forces current conduction in phases that do not carry current during a typical six-pulse operation. The boost converter requires a boost inductor and since it is desired not to switch at high frequency to limit the conducted EMI, the size of the boost inductor is bigger than normal. The switching frequency of the switches is kept at 2 times the supply frequency. It will be 100 Hz for a 50 Hz AC source and 120 Hz in case of a 60 Hz AC source.

FIG. 1A shows the original method that needed access to the neutral of input AC source. By introducing a dc bus midpoint configuration the original circuit was modified to the circuit shown in FIG. 1B. This allows for the implementation of the active filter circuit without the need to access the neutral of the AC source.

It is well known that there are six distinct diode pairs that conduct in a typical 3-phase AC to DC rectifier. Each interval lasts 60 electrical degrees. The typical phase current is seen to flow for two back to back intervals of 60 electrical degrees, resulting in 120 degree conduction in one half of the electrical cycle. The other half of the electrical cycle also has a similar interval but during this interval, the phase current direction is opposite to the first half since the input current does not have any DC component in a given cycle.

The above description of the diode pair conduction during the rectifier operation shows that one phase does not conduct when the other two phases are conducting. This opens up an opportunity to do something with the non conducting phase when the other phases are conducting. By employing a switch and forcing current to flow through the non conducting phase via the switch into the midpoint of the DC bus, current can be made to flow through the non-conducting phase. To limit the current flowing into the DC bus midpoint, it is standard practice to employ inductors. At some point, the switch needs to be turned OFF and since the inductor is carrying current, it cannot be abruptly stopped. Turning OFF of the switch causes the voltage across the inductor to rise and similar to a boost converter, the energy stored in the inductor is transferred to the DC bus. By turning ON and OFF the switch at the correct time can result in continuous current to flow in the phases. By selecting the inductor appropriately, the current at the end of the conducting period is made equal to about one-half of the peak value of the rated output current.

In the Mehl and Barbi document the control philosophy has not been discussed and the conduction duration of the switches is manually adjusted depending on the load condition.

Figure 2:
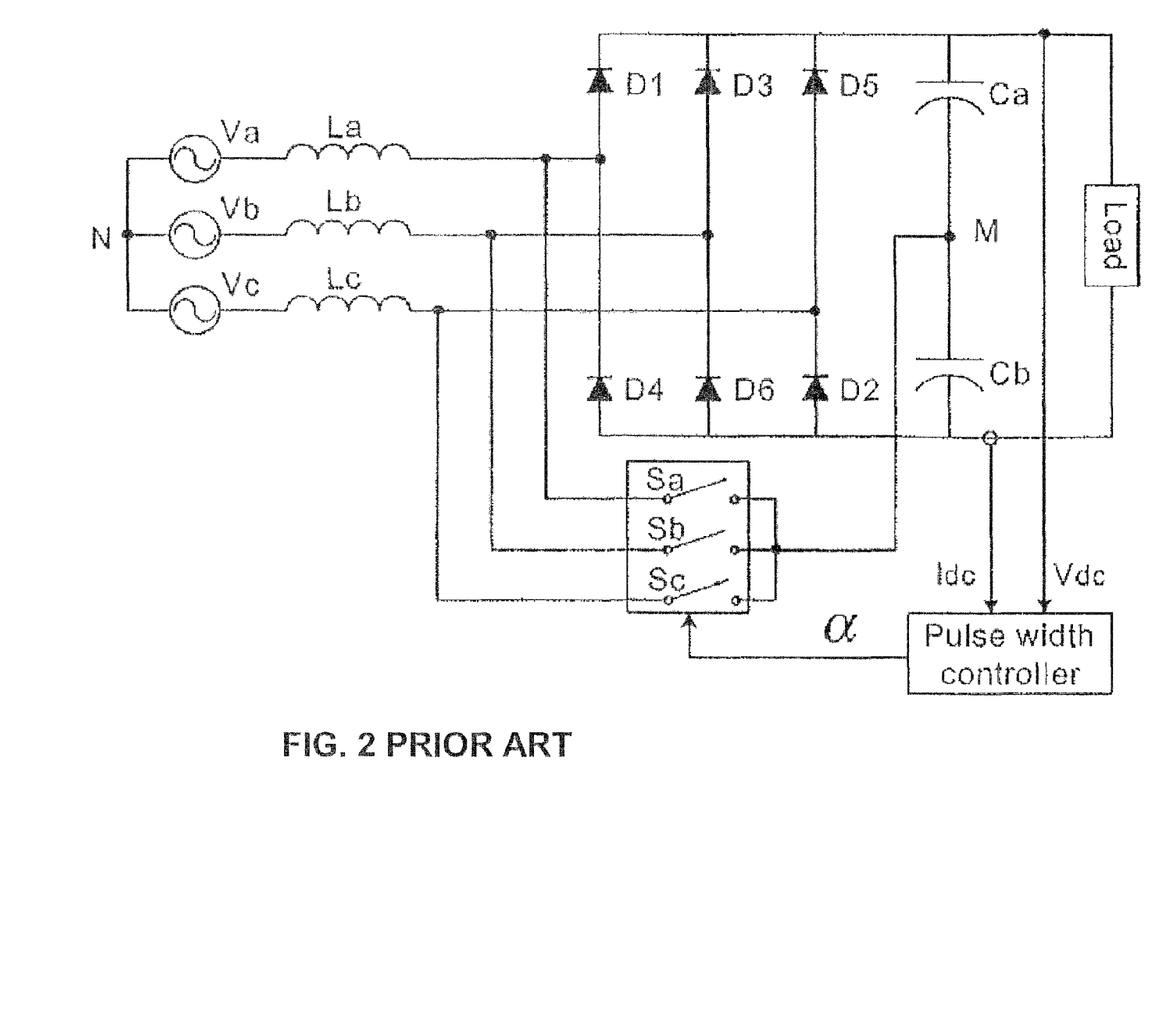

A control scheme to control the circuit in FIG. 1B to regulate the DC bus of the VFD was put forth by the authors in Ali I. Maswood, and Fangrui Liu in "A Novel Unity Power Factor Input Stage for AC Drive Applications", IEEE Trans. on Power Electronics, Vol. 20, No. 4, July 2005, pp: 839-846. This control scheme is illustrated in the circuit of FIG. 2. The final topology along with the control strategy discussed in these documents has significant drawbacks. Some important drawbacks are:

a. The topology shown in FIG. 1B and the control strategy shown in FIG. 2 require that the input AC supply be a "wye" connected three phase AC system. In many industrial applications, the 3-phase AC source could be delta connected. The control scheme will need to be modified to adapt to a delta connected AC system.

b. The control idea shown in FIG. 2 aims to achieve DC bus regulation with low input current harmonics for a wide load range, from 40% load to 110% load. In order to achieve this, a current sensor is used in the DC link. When the load current is large, the size and rating of the current sensor needed increases. In addition, the location of the current sensor that is shown in FIG. 2 can create unwanted inductance in the DC bus structure of a VFD and may need an additional snubber to absorb high voltage transients across the inverter switches of the VFD.

c. From the discussions in these documents it is important to note that the DC bus capacitors that form the DC bus filtering network are required to carry the ripple current that is injected into the AC source to reduce the input current distortion. The size and current rating of the standard electrolytic capacitor will need to be increased to handle the additional ripple current.

The control philosophy used with the circuit of FIG. 2 aims to maintain DC bus voltage at the desired reference level under a wide load range. When the load is less than the rated load, the conduction angle α is reduced depending on the sensed current Idc. When the load is greater than the rated load, the conduction angle is allowed to increase to maintain the DC bus voltage at the reference level. The document describes a strategy having a minimum value for conduction angle α of 14.9 electrical degrees. On the other hand, there exists no upper limit to the conduction angle. However, for safety reasons, the conduction angle cannot be higher than 60 electrical degrees. The drawbacks of this control strategy are as follows.

At very light load condition, maintaining a minimum conduction angle can result in over voltage at the DC bus terminals. The boost action can make the DC bus voltage reach dangerously high levels that can damage the inverter components and cause high voltage stress across the DC bus capacitors. At higher than rated load level, the current in the input inductor will increase to maintain the set DC bus voltage level. The input AC inductors will need to be designed to handle the extra current. This will make them expensive and larger in size. The current rating of the bidirectional switch will also need to be increased. Finally, the current sensor shown in FIG. 2 needs to be placed in between the inverter section and the DC capacitors. This means that the current sensor needs to be rated for the overload rating of the AC to DC rectifier. Moreover, the negative bus needs to be intercepted to insert the current sensor and this can add inductance to the bus circuit that can result in the need for a higher snubber capacitor across the inverter switches in case the load is a VFD type motor drive system.

SUMMARY

As disclosed herein, an active filter circuit maintains DC bus voltage level at a desired reference level under a wide load range.

Broadly, there is disclosed herein a voltage source inverter comprising a rectifier having an input for receiving multiphase AC power from an AC source and converting the AC power to DC power at an output. An inverter receives DC power and converts the DC power to AC power. A link circuit is connected between the rectifier circuit and the inverter circuit and comprises a DC bus having first and second rails to provide a relatively fixed DC voltage for the inverter. A DC bus capacitor across the first and second rails smoothes voltage ripple. An active filter circuit comprises a pair of filter capacitors in series across the first and second rails to create a midpoint. Bidirectional switches are connected between the rectifier input and the midpoint. A current sensor is connected between the bidirectional switches and the midpoint. An active switch controller is operatively connected to the AC source, the first and second rails and the current sensor for controlling a conduction angle of the bidirectional switches to maintain DC bus voltage at a desired reference level under a wide load range.

There is also disclosed a boost converter comprising a rectifier having an input for receiving multiphase AC power from an AC source and converting the AC power to DC power at an output. A link circuit is connected to the rectifier circuit output and comprises a DC bus having first and second rails to provide a relatively fixed DC voltage for a load comprising plural DC/AC converters fed from a common DC voltage source with each DC/AC converter having a DC bus capacitor to smooth voltage ripple. An active filter circuit comprises a pair of filter capacitors in series across the first and second rails to create a midpoint. Bidirectional switches are connected between the rectifier input and the midpoint. A current sensor is connected between the bidirectional switches and the midpoint. An active switch controller is operatively connected to the AC source, the first and second rails and the current sensor to control a conduction angle for the bidirectional switches to maintain DC bus voltage at a desired reference level under a wide load range.

It is a feature that the active filter circuit bidirectional switches comprise one for each phase. The bidirectional switches may comprise two IGBTs having emitters connected together and controlled by the active switch controller or a switch connected between nodes of a diode bridge.

It is another feature that the active switch controller controls a conduction angle in a range of 0° degrees to 30°.

It is a further feature that the DC bus capacitor comprises an electrolytic capacitor and the filter capacitors comprise film capacitors.

It is still another feature that a multiphase boost inductor is connected between the AC source and the rectifier input.

It is a further feature that the active switch controller monitors ripple current and reduces the conduction angle if the ripple current increases.

It is still another feature that a resistor network is connected across the input AC source and used as a reference voltage for detecting zero crossings. The resistor network may be configured in a wye to phase shift the reference voltage if the AC source is configured in delta.

Other features and advantages will be apparent from a review of the entire specification, including the appended claims and drawings.

DETAILED DESCRIPTION

Figure 3:
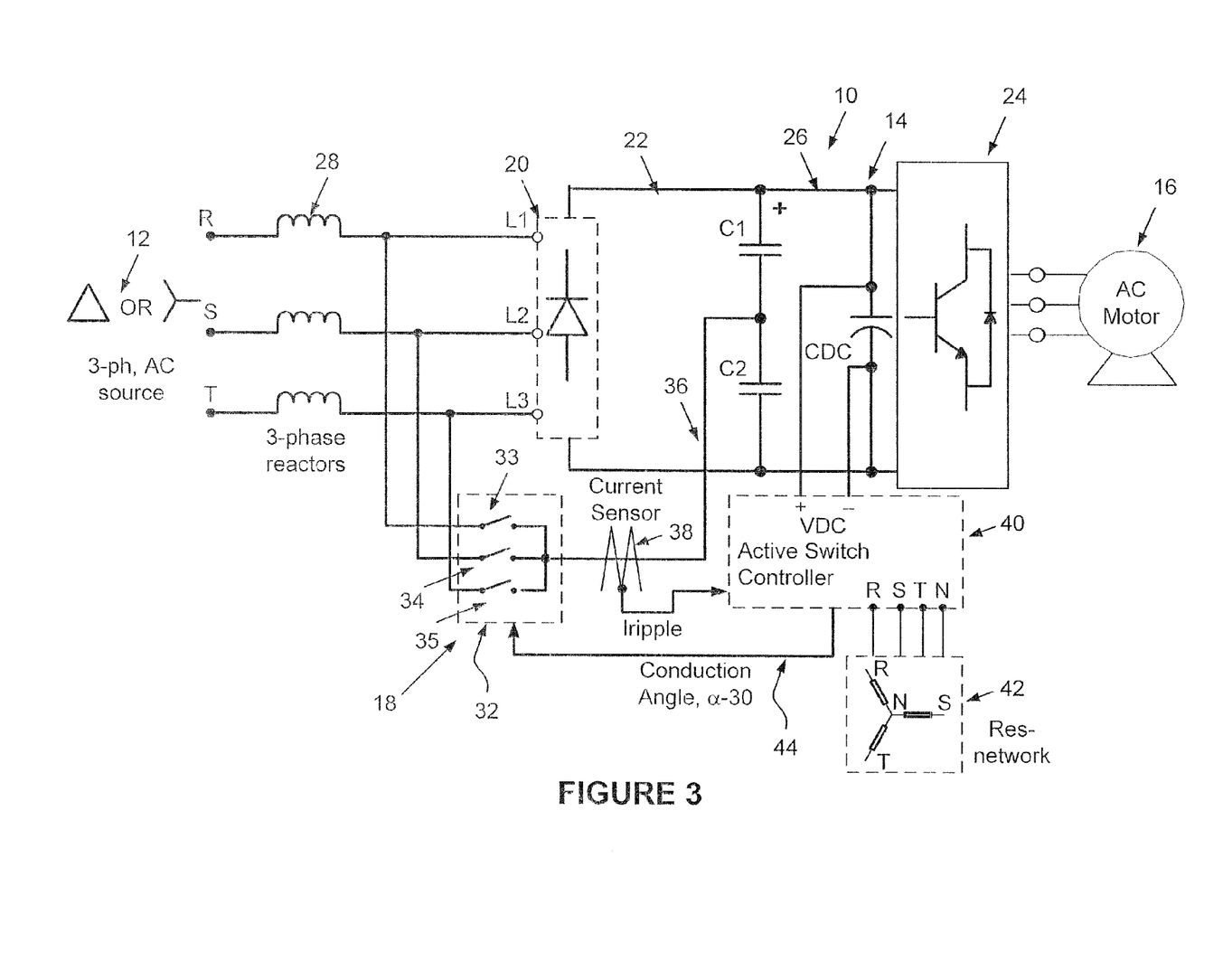
FIG. 3 is a schematic for a voltage source inverter based variable frequency drive as disclosed herein.

Referring to FIG. 3, a motor drive system 10 is illustrated. The motor drive system 10 includes an AC source 12 and a variable frequency drive (VFD) 14 configured as a voltage source inverter for driving an induction motor 16. As is known, a control unit (not shown) would be used for controlling the VFD 14. However, such control unit is not shown herein as it does not itself form part of the invention. Instead, the invention relates particularly to the use of an active filter circuit 18, described below.

The AC source 12 may comprise a drive or the like developing three phase AC power at terminals labeled R, S and T. The AC source 12 may have a wye or delta configuration, as desired. The VFD 14, as described more particularly below, converts the AC power to DC power and converts it back to AC power at a select frequency which is impressed across terminals U, V and W. The terminals U, V and W are connected to the motor 16.

The VFD 14 includes an AC/DC converter 20 connected by a DC link circuit 22 to a DC/AC converter 24. In an illustrative embodiment of the invention, the AC/DC converter 20 comprises a full wave bridge rectifier circuit of conventional construction which is operable to convert three phase AC power to DC power. Particularly, the AC/DC converter 20 comprises a diode rectifier. The DC link circuit 22 comprises a DC bus 26 defined by rails labeled "plus" and "minus". A DC bus capacitor $C_{DC}$ is connected across the DC bus 26. The DC/AC converter 24 comprises an inverter section. Typically, the inverter section comprises a pulse width modulation inverter using solid state switching devices connected in a three phase bridge configuration to the DC bus 26 to develop AC power at the terminals U, V and W. The switches are pulse width modulated by control signals using a conventional control scheme. Particularly, the PWM inverter 24 is controlled to create a sinusoidal effect for the induction motor 16. The pulse frequency is typically fixed. The modulation frequency is varied to control the speed of the induction motor 16 and the pulse width is varied to control the voltage impressed across the induction motor 16.

As will be apparent, the active filter circuit 18 is not limited to use with any particular AC/DC converter and/or DC/AC converter.

The active filter circuit 18 includes a three phase reactor 28 connected between the AC source 12 and an input to the rectifier 20. A pair of filter capacitors C1 and C2 are connected in series across the DC bus 26 to define a midpoint 30. A bidirectional switch circuit 32 is connected between the input to the rectifier 20 and the midpoint 30. Particularly, the bidirectional switch circuit 32 comprises three bidirectional switches 33, 34 and 35, one for each phase, connected between respective input terminals L1, L2 and L3 and having outputs connected via a line 36 to the midpoint 30. A current sensor 38 senses current on the line 36 to sense ripple current. The current sensor 38 is connected to an active switch controller 40. The active switch controller 40 is also connected across the bus capacitor $C_{DC}$ to measure DC bus voltage. A resistor network 42 is connected between the R, S and T terminals at the AC source 12 to the active switch controller 40. The active switch controller 40 develops a conduction angle control signal on a line 44 to control operation of the bidirectional switch circuit 32.

Figure 4:
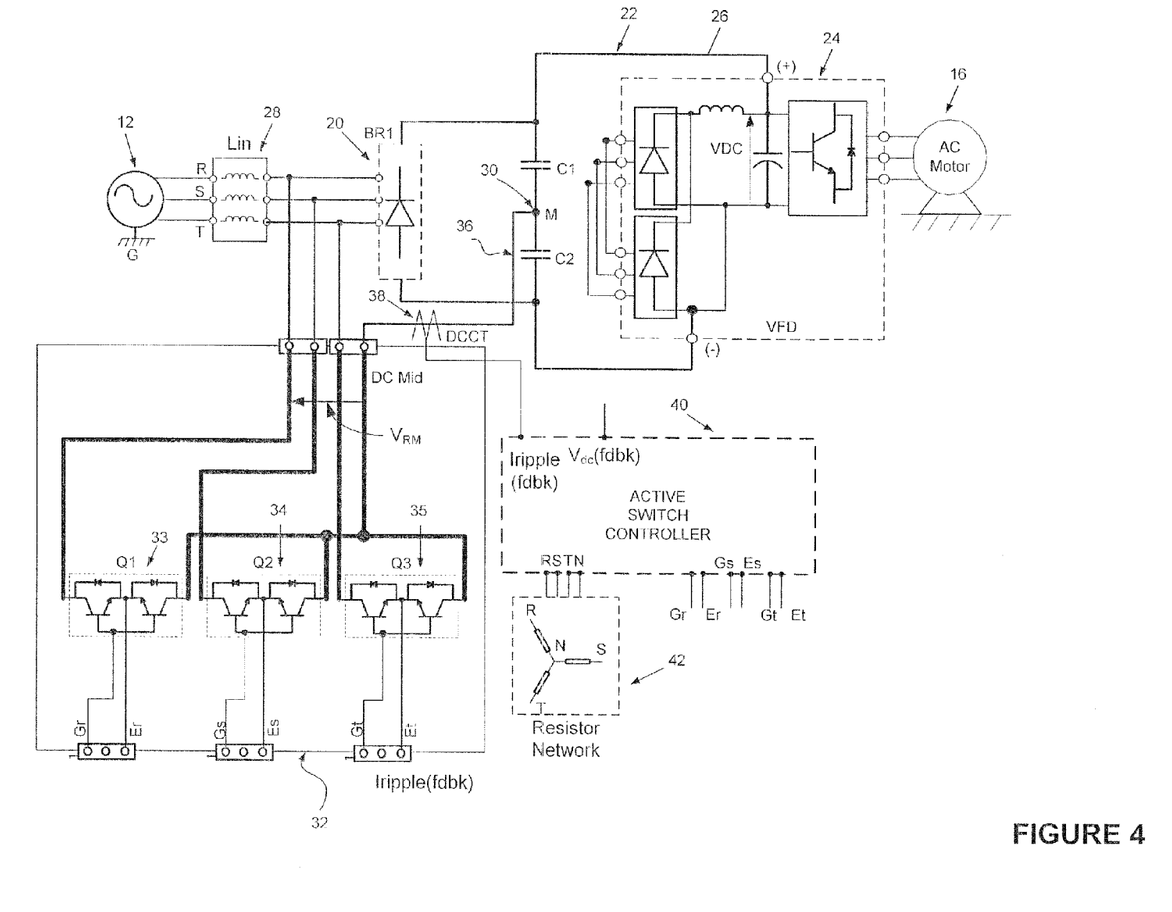
FIG. 4 is a more detailed schematic of the voltage source inverter based variable frequency drive.

FIG. 4 illustrates a schematic generally similar to that in FIG. 3 showing greater detail. Particularly, each of the bidirectional switches 33-35 is illustrated in greater detail and comprises two IGBTs having emitters connected together. A common pulse of width a is applied the gates of both IGBTs by the active switch controller 40. The pulse starts at an angle of zero degrees based on a zero crossing of the input source line-neutral voltage waveform, as provided by the resistor network 42. The width of the pulse is determined by the conduction angle α. Hence the pulse width can be said to be of duration α in degrees. This can be converted into time depending on the source frequency. 360 electrical degrees would correspond to 16.66 ms for 60 Hz, 20 ms, for 50 Hz, and 2.5 ms for 400 Hz.

Figure 5:
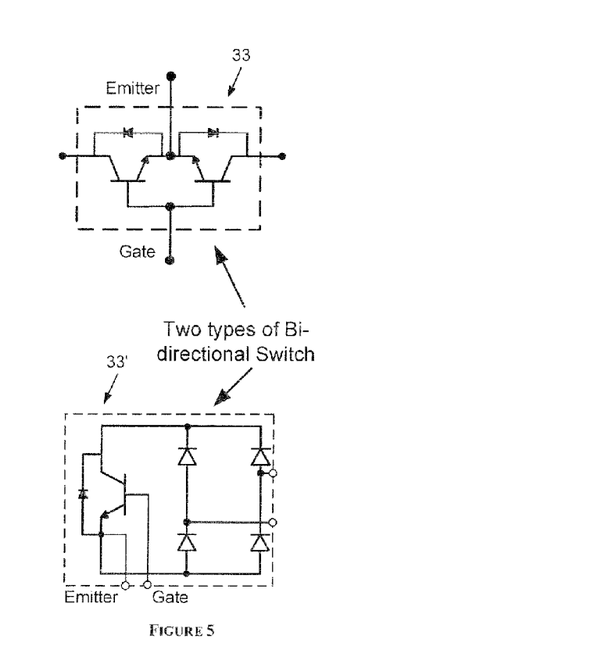
FIG. 5 are electrical schematics of different types of bidirectional switches.

The bidirectional switch 33 is shown in FIG. 5. Alternatively, the bidirectional switches could utilize a circuit in which a switch is connected between nodes of a diode bridge as illustrated with the circuit 33' of FIG. 5.

Figure 6:
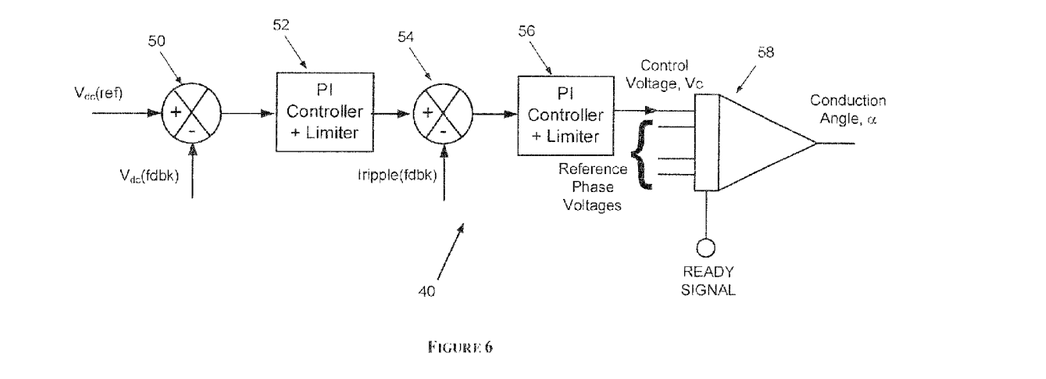
FIG. 6 is a block diagram of the active switch controller used with the circuits of FIGS. 3 and 4.

FIG. 6 illustrates a block diagram for the active switch controller 40. A summer 50 receives a desired reference level $V_{dc}$(ref) representing a desired DC bus voltage. This is compared to a feedback signal $V_{dc}$(fdbk) comprising the actual measured voltage across the DC bus 26. The output of the summer 50 is input to a proportional and integral (PI) controller and limiter 52, the output of which is input to a summer 54 which subtracts the current ripple signal from the current sensor 38. The output of the summer 54 is applied to a PI controller and limiter 56 which develops a control voltage $V_c$ applied to a comparator 58. The comparator 58 receives reference phase voltages from the resistor network 42 and develops the conduction angle signal alpha which is output to the bidirectional switch circuit 32.

Figure 7:
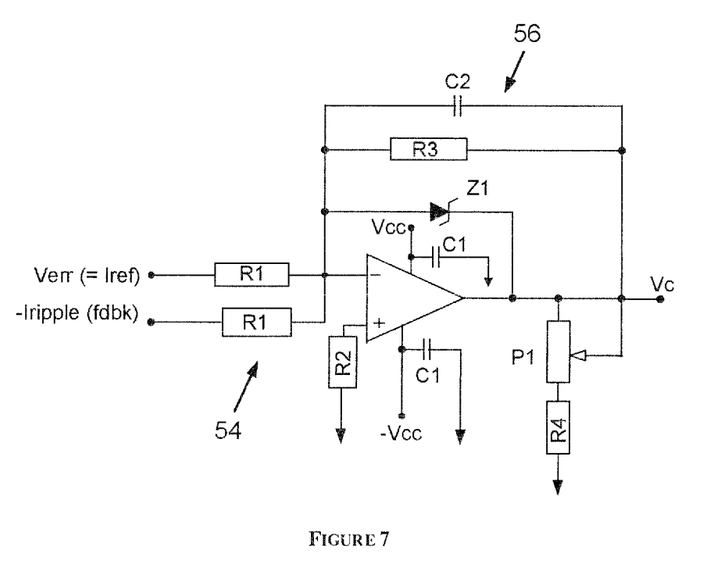
FIG. 7 is an electrical schematic of a PI controller and limiter of FIG. 6.

The PI controller and limiter 56 is shown in greater detail in FIG. 7 and uses a Zener diode based clamping circuit to assure that the pulse width is limited preferably to 30 electrical degrees.

As discussed above, the conduction angle and pulse width for gating the bidirectional switches 33-35 are the same. The pulse starts at the angle 0° representing the zero crossing of the corresponding line to neutral voltage wave form from the resistor network 42. The width of the pulse is determined by the conduction angle α.

The IGBTs of each bidirectional switch 33-35 are gated by the common pulse. Depending on the direction of current flow, only the appropriately polarized IGBT will conduct. The current flowing through the free wheeling diode across the non-conducting IGBT will assure that the non-conducting IGBT experiences a reverse voltage and hence will never be forward biased. The end of the duration of the pulse is characterized by a 0 voltage across the gate-emitter of the IGBT, which turns off the IGBT. Practically, at this point, the gate drive circuit issues out a reverse gate-emitter voltage to assure proper turnoff of the IGBT.

As is apparent, the conduction angle used to control the IGBTs is determined by the level of the DC bus voltage and the amplitude of the switch current from the sensor 38. Particularly, the comparator 58 uses a common DC input and compares it simultaneously with each of the phase transformed voltages to generate the conduction angle α. Three different comparators are used, one for each phase. The angle is generated at the same time and is channeled to the appropriate bidirectional switches 33-35 corresponding to the particular phase. The angle for each switch is hence the same relative to its corresponding phase voltage.

In FIG. 2 the AC source is configured in wye. There are many instances where the 3-phase AC source is configured in a delta. To accommodate this, the conduction angles need to be shifted by 30 electrical degrees. In other words, for a given operating condition if the conduction angle is α with the input configured in wye, then it will need to be 30+α when the input is configured in delta. To accommodate this, a high impedance resistor network configured in a wye is used. The phase to neutral voltage out of the 3-phase resistor network is used as the reference voltage for zero crossing. This phase shifted voltage reference yields the desired 30 degrees phase shifted needed to accommodate AC sources configured in Delta. If the input is already configured in wye, the output from the resistor network does not undergo any phase shift and so the resistor network can remain irrespective of the configuration of the input AC source.

The topology described in FIGS. 1A, 1B and 2 use standard electrolytic capacitors that are required to handle the ripple current as well as the low frequency power component. This additional requirement needed of the electrolytic capacitor, makes it bulkier and prone to more power loss. Instead of using electrolytic capacitors, the system herein changes the filter configuration so that film capacitors are used for providing the ripple current and an electrolytic capacitor is used for the standard power frequency requirement. This separation helps in optimizing both the film capacitor and the electrolytic capacitor resulting in a smaller sized and more efficient configuration. In fact, tests have shown that the existing electrolytic capacitors across the DC bus can be reduced by 33%. Further optimization is also possible.

By separating the ripple current handling capacitor from the electrolytic capacitor, it is possible to use the active filter topology as a standalone structure with its DC output being connected to the VFD DC bus so that the VFD is powered from a regulated DC source. This separation is beneficial in a common DC bus configuration.

In order to overcome the drawbacks listed above with respect to the circuits of FIGS. 1A, 1B and 2, the control strategy disclosed herein allows the conduction angle α to go down to zero degrees to accommodate no load and light load conditions. The maximum conduction angle is limited to 30 electrical degrees, which results in the lowest level of current distortion achievable. For load conditions higher than the rated load condition, the DC bus voltage level is allowed to go down in order to limit the stresses on the input inductor and to allow choice of optimal current rating for the bidirectional switches. The ripple current through the capacitor is monitored and is used as a protection feature to reduce the conduction angle in cases where the current increases due to a surge or due to saturation of the input AC filter inductors. By changing the current monitoring position and its purpose from regulating the DC bus to protecting the ratings of the components of the rectifier system, the size and rating of the current sensor is significantly reduced. The DC bus need not be intercepted resulting in an integrated bus structure with low inductance that can reduce the overall snubber requirement for the VFD switches.

From the discussions put forth above, the advantages of the system are as follows: The present system emphasizes changing the control strategy from regulating the DC bus from 40% load to 110% load to regulating the DC bus from no load to only up to the rated load level. Above this, the DC bus is allowed to fall by clamping the control angle α to 30 electrical degrees. The system does not put a lower limit on the control angle α so that at light load condition or at no load condition, the value of α is allowed to go down to zero if the DC bus voltage is higher than the desired level. In other words, the lower value of α is clamped to zero electrical degrees. Current feedback is not to be used as inner loop for DC bus voltage control. Instead, the current through the switches are monitored and the control angle is suitably modified to limit the high current caused by faulty operation or a saturated inductor due to faulty inductor design. Hence, current feedback is being used to be relegated to protection rather than DC bus voltage regulation. This change in control strategy allows the change of current sensor location from the main DC bus to the place where only ripple current flows. The size and current rating of the current sensor is significantly reduced and allows easier integration. By separating the filter capacitor from the main DC bus capacitors, common DC bus application is easy to implement. The DC bus capacitor can be a standard electrolytic capacitor, while the higher ripple current is handled by the AC filter capacitors. The capacitance of the electrolytic DC bus capacitors can be reduced by 33% since the higher ripple current can now be handled by the film capacitors introduced across the DC bus in a mid-point configuration. The system also shows an adaptation for including a delta connected source. This is achieved by using a high impedance wye connected resistor network for phase transformation of the control signals. The addition of this impedance network helps in accommodating either wye or delta connected power supplies.

Figure 8:
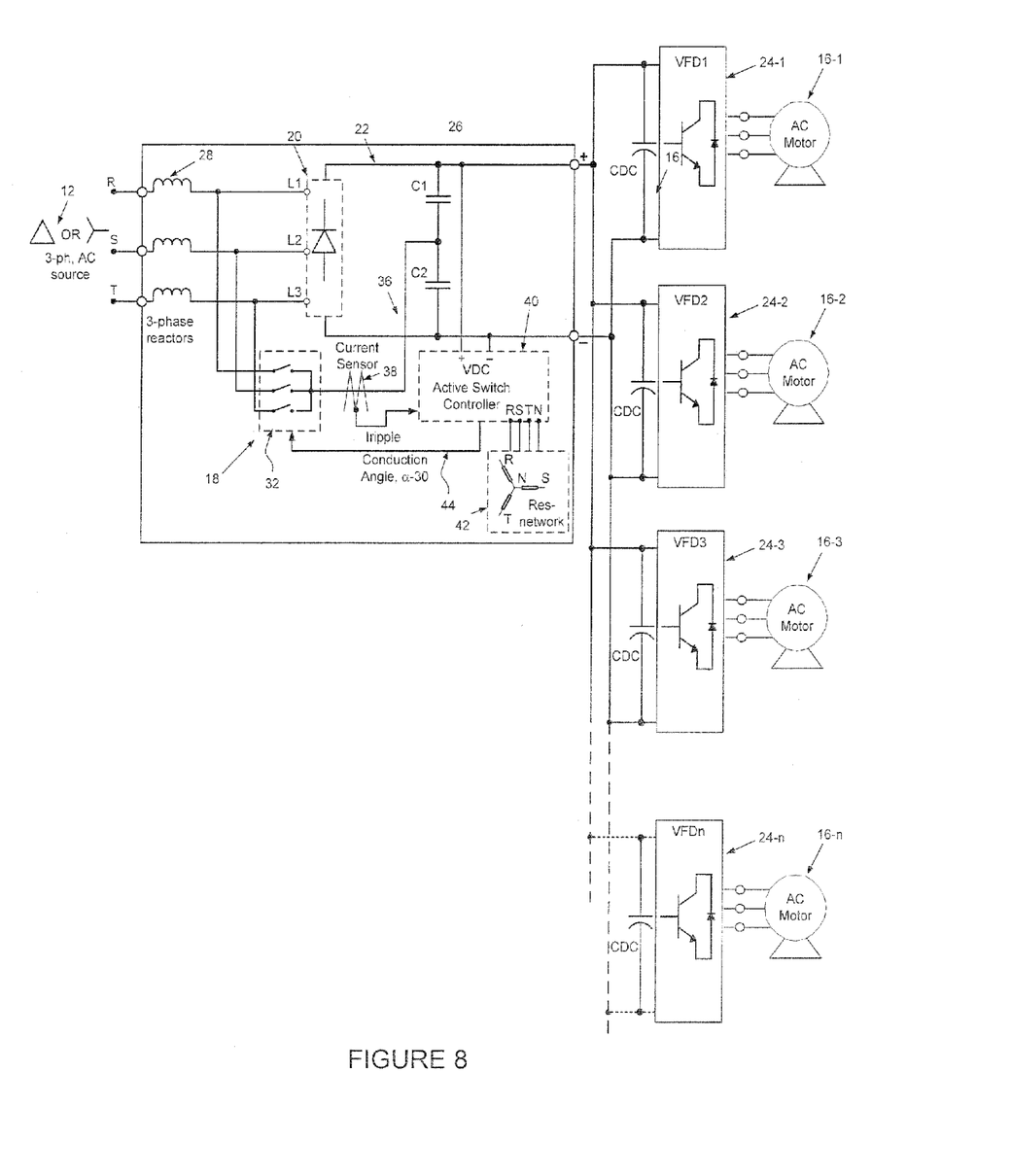
FIG. 8 is a schematic for a voltage source inverter based boost converter system.

The front end of the VFD 14 may be used as a boost converter system 60, see FIG. 8. This allows multiple DC/AC converters 24-1, 24-2, 24-3 through 24-N to be driven by the common DC link circuit 22. Each of the multiple DC/AC converters 24-1, 24-2, 24-3 through 24-N drives a respective induction motor 16-1, 16-2, 16-3 through 16-N. The DC link circuit 22 is connected to the rectifier circuit output and provides a relatively fixed DC voltage for a load comprising the plural DC/AC converters 24-1, 24-2, 24-3 through 24-N fed from a common DC voltage source with each DC/AC converter 24-1, 24-2, 24-3 through 24-N having a DC bus capacitor $C_{DC}$ to smooth voltage ripple.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A voltage source inverter comprising:
a rectifier having an input for receiving multi phase AC power from an AC source and converting the AC power to DC power at an output;
an inverter for receiving DC power and converting the DC power to AC power;
a link circuit connected between the rectifier and the inverter and comprising a DC bus having first and second rails to provide a relatively fixed DC voltage for the inverter, and a DC bus capacitor across the first and second rails to smooth voltage ripple; and
an active filter circuit comprising a pair of filter capacitors in series across the first and second rails to create a midpoint, bidirectional switches connected between the rectifier input and the midpoint, a current sensor connected between the bidirectional switches and the midpoint and an active switch controller operatively connected to the AC source, the first and second rails and the current sensor for controlling a conduction angle of the bidirectional switches to maintain DC bus voltage at a desired reference level under a wide load range.

2. The voltage source inverter of claim 1 wherein the bidirectional switches comprise one for each phase.

3. The voltage source inverter of claim 2 wherein each of said bidirectional switch comprises two IGBTs having emitters connected together and gates controlled by the active switch controller.

4. The voltage source inverter of claim 2 wherein each of said bidirectional switch comprises a switch connected between nodes of a diode bridge.

5. The voltage source inverter of claim 1 wherein the active switch controller controls the conduction angle in a range of 0° to 30°.

6. The voltage source inverter of claim 1 wherein the DC bus capacitor comprises an electrolytic capacitor and the pair of filter capacitors comprise film capacitors.

7. The voltage source inverter of claim 1 further comprising a multi phase boost inductor connected between the AC source and the rectifier input.

8. The voltage source inverter of claim 1 wherein the active switch controller monitors ripple current and reduces the conduction angle if the ripple current increases.

9. The voltage source inverter of claim 1 further comprising a resistor network connected between the AC source and the active switch controller used as a reference voltage for detecting zero crossings.

10. The voltage source inverter of claim 9 wherein the resistor network is configured in a wye to phase shift the reference voltage if the AC source is configured in delta.

11. A boost converter comprising: a rectifier having an input for receiving multi phase AC power from an AC source and converting the AC power to DC power at an output; a link circuit connected to the rectifier output and comprising a DC bus having first and second rails to provide a relatively fixed DC voltage for a load comprising plural DC/AC converters fed from a common DC voltage source with each of the plurality of DC/AC converters having a DC bus capacitor to smooth voltage ripple; and an active filter circuit comprising a pair of filter capacitors in series across the first and second rails to create a midpoint, bidirectional switches connected between the rectifier input and the midpoint, a current sensor connected between the bidirectional switches and the midpoint and an active switch controller operatively connected to the AC source, the first and second rails and the current sensor for controlling a conduction angle of the bidirectional switches to maintain DC bus voltage at a desired reference level under a wide load range.

12. The boost converter of claim 11 wherein the bidirectional switches comprise one for each phase.

13. The boost converter of claim 12 wherein each bidirectional switch comprises two IGBTs having emitters connected together and gates controlled by the active switch controller.

14. The boost converter of claim 12 wherein each bidirectional switch comprises a switch connected between nodes of a diode bridge.

15. The boost converter of claim 11 wherein the active switch controller controls conduction angle in a range of 0° to 30°.

16. The boost converter of claim 11 wherein the DC bus capacitor comprises an electrolytic capacitor and the filter capacitors comprise film capacitors.

17. The boost converter of claim 11 further comprising a multi phase boost inductor connected between the AC source and the rectifier input.

18. The boost converter of claim 11 wherein the active switch controller monitors ripple current and reduces the conduction angle if the ripple current increases.

19. The boost converter of claim 11 further comprising a resistor network connected between the AC source and the active switch controller used as a reference voltage for detecting zero crossings.

20. The boost converter of claim 19 wherein the resistor network is configured in a wye to phase shift the reference voltage if the AC source is configured in delta.

* * * * *